United States Patent
Kristensen

[11] Patent Number: 6,142,430
[45] Date of Patent: Nov. 7, 2000

[54] WRIST SUPPORT PROVIDED WITH COMPUTER INPUT DEVICE

[76] Inventor: Kurt Kristensen, Zahlmannsvænget 12, DK-3400 Hillerod, Denmark

[21] Appl. No.: 09/026,556

[22] Filed: Feb. 20, 1998

[30] Foreign Application Priority Data

Feb. 24, 1997 [DK] Denmark ................................. 0197/97

[51] Int. Cl.⁷ ...................................................... B43L 15/00
[52] U.S. Cl. ....................... 248/118.1; 248/918; 400/715; 400/479
[58] Field of Search ............................... 248/118.1, 118.3, 248/118.5, 918; 400/715, 479, 477; 200/5 R, 6 A; 273/148 R; 708/139

[56] References Cited

U.S. PATENT DOCUMENTS

| | | | |
|---|---|---|---|
| 4,786,768 | 11/1988 | Langewis et al. | 200/6 A |
| 4,823,634 | 4/1989 | Culver | 74/471 XY |
| 5,305,238 | 4/1994 | Starr, III et al. | 364/569 |
| 5,615,083 | 3/1997 | Burnett | 361/686 |
| 5,694,123 | 12/1997 | Selker et al. | 341/22 |
| 5,829,899 | 11/1998 | Chao | 400/715 |

FOREIGN PATENT DOCUMENTS 2287526A   9/1995   United Kingdom .

*Primary Examiner*—Ramon O. Ramirez
*Assistant Examiner*—Gwendolyn Baxter
*Attorney, Agent, or Firm*—Ostrolenk, Faber, Gerb & Soffen, LLP

[57] ABSTRACT

A wrist support for computer keyboard in the form of an elongated cabinet, the wrist support being provided with an input device comprising a control stick uprightly arranged on a base plate, a number of strain gauge transducers adhered to the control stick, wherein the base plate is displaceably arranged within the cabinet and the control stick is positioned in a slit in the upper face of the cabinet. The input device for use in the wrist support comprises a base plate adapted to be displaceably mounted on a support by floating suspension means arranged in the base plate, the suspension means comprising a fixing area and a flexible connection between the fixing area and the residual area of the base plate, a control stick being uprightly mounted on the base plate provided with a number of strain gauges adhered to the side face of the control stick for controlling an object in a first and second direction on a computer monitor connected to the input device, and an additional number of strain gauges being adhered to the surface of the base plate and bridging the fixing area and the residual area of the base plate to control the object in a third direction.

4 Claims, 2 Drawing Sheets

WRIST SUPPORT PROVIDED WITH COMPUTER INPUT DEVICE

BACKGROUND OF THE INVENTION

1. Field of the Invention

The present invention relates to a wrist support with a computer input device in the form of a unitary member for ergonomically correct keyboard operation and control of position of a cursor or object on computer monitors.

2. Description of the Related Art

Conventional computer working spaces include a keyboard, a computer together with a computer monitor, and a supplemental input device as a separate member. Lately, employment of wrist supports in the form of elongated and compact bodies with a height corresponding to the height of the keyboard have been recommended to avoid physical damages to the wrist during frequent or long-term use of the keyboard. Such a wrist support is adapted to be positioned in front of the keyboard.

The most conventional input device to use for control of cursor movement on the monitor is the so-called "mouse" or track ball device. The primary function of the mouse is to move the cursor or a pointing marker. Conventional mice are, furthermore, provided with functions keys to select functions the marker points on.

The known mouse design operates on various different principles. Common to all the principles is that physical movement of the mouse body controls the movement of a cursor or marker on the computer screen. During the movement of the mouse, rotational movement of a roller ball arranged within the housing of the mouse is converted by means of electronic motion sensors to digital signals. These signals are forwarded to a microprocessor, which interprets the digital values to represent the movement of the mouse. The digital information from the sensors is converted into an appropriate data format and sent to the computer. In the computer, the data is converted via a software program to the rendering of an object or to a two-dimensional movement of the cursor or marker on the monitor.

Input devices of the above-described kind are available in a number of designs with a variety of different electronic sensors for providing proper and effective translation of physical movement of the mouse device into digital signals for cursor control.

The main drawback of the known mouse design is, however, that it places a serious strain (and risk of injury) to the wrist and hand moving the mouse if used for longer periods of time.

In the past, attempts have been made to provide input devices without the above drawbacks of the known mouse designs. These prior art devices control in general data input by means of stationary sensors, such as piezoelectrical or strain gauge transducers. A strain gauge utilizes the change of electrical resistance to measure strain. The resistance of a strain gauge is the electrical resistance between two metal strips designed for connection of a measuring cable or between solder taps. The transducers are bonded to a stationary control stick and measure stress when the stick is deflected during actuation. The stick is usually arranged uprightly on a reference plate.

A stationary input device of the above kind is disclosed in Great Britain Patent Application No. 2,287,526. The disclosed device includes a flat plate on which a control stick is arranged vertically. On the stick, strain gauges are adhered to four side faces of the stick, so that deflection of the stick in the X or Y direction is detected by strain gauges adhered to the corresponding side face of the stick. The input device is integrated into the keyboard and typically located a central position between the keys.

SUMMARY OF THE INVENTION

An object of this invention is to improve upon the above-described known stationary input devices by arranging such a device within a wrist support, which allows optimum ergonomic operation of the keyboard and input device.

A further object of the invention is to provide an input device by which a cursor or an object can be controlled on the computer monitor in three dimensions.

Accordingly, the present invention is a wrist support for computer keyboard in the form of an housing, the wrist support being provided with an input device comprising a control stick uprightly arranged on a base plate, a number of strain gauge sensors adhered to the control stick, wherein the base plate is displaceably arranged within the cabinet and the control stick is positioned in a slit in the upper face of the cabinet.

The ergonomically correct operation of the keyboard is provided in the present invention by the combination of the wrist support and input device, which supports the hands during typing and relieves muscles and sinews by reducing unnecessary movement of the hands. A further advantage of the invention is that the input device may be placed in the wrist support in any position which is most convenient to the operator by moving the device in the slit to the required position.

To avoid undesired displacement during operation of the device, the base plate may be locked in the cabinet by conventional locking means, such as screws or snaps.

In a further embodiment of the invention, the wrist support is additionally provided with one or more function keys displaceably arranged in the slit of the support cabinet.

Like the input device, the function key or keys can be positioned in the slit of the cabinet in the position most convenient to the operator.

Electrical connection of the various devices in the wrist support to the computer and their electronic function is conventional and known in the art.

As mentioned above, strain gauges are conventionally employed in stationery computer input devices to use in control of an object in the twodimensional plane on the monitor.

In many applications it is, however, required to control the object in addition to the two-dimensional plane in a quasi-three-dimensional perspective space. Such a control or moving operation may be rotation of an object on the monitor.

Thus, according to a further object of this invention, a computer device of the above-described kind comprises a base plate, which is displaceably mounted on a support by floating suspension means arranged in the base plate, the suspension means consists of a fixing area fastening the base plate to the support and a flexible connection between the fixing and residual area of the base plate, a control stick uprightly mounted on the base plate, a number of strain gauges adhered to the control stick for controlling an object in a first and second direction on a computer monitor, and a number of strain gauges adhered to the surface of the base plate between the fixing area and the residual area of the base plate to control the object in the third direction.

Other features and advantages of the present invention will become apparent from the following description of the preferred embodiment of the invention with reference to the accompanying drawings.

DETAILED DESCRIPTION OF THE PREFERRED EMBODIMENT

The figures are simplified, and connections, cables, and parts which are conventional are not shown.

Figure 1:
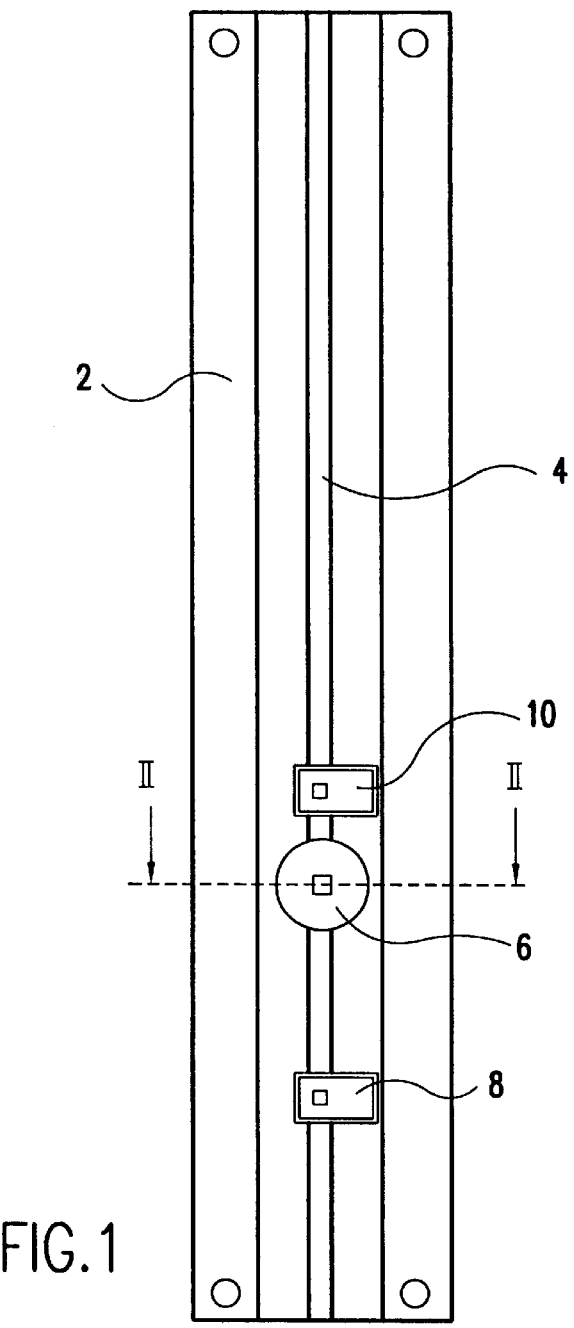
FIG. 1 is a top plane view of a wrist support according to an embodiment of the invention.

Referring first to FIG. 1, a wrist support according to a specific embodiment of the invention consists of a housing 2 with a length and height similar to the corresponding dimensions of a keyboard in order to provide appropriate support to the hands and wrists when located in front of the keyboard. A slit 4 is arranged in housing 2 over the entire length. An input device 6 and a number of function keys 8 and 10 can be pushed in the slit to any position convenient to the operator.

Figure 2:
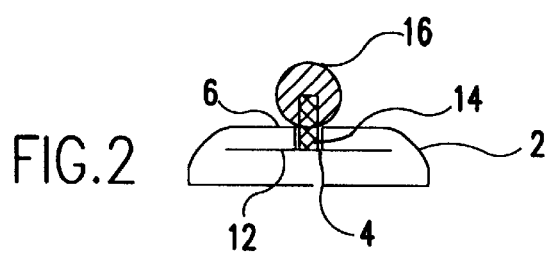
FIG. 2 is a sectional view taken alone line A—A of FIG. 1.

Input device 6 consists of a base plate 12, a control stick 14, and a maneuver ball 16 as schematically shown in FIG. 2.

The input device is mounted in housing 2 of the wrist support such that stick 14 is located centrally within slit 4 from the edges of the slit. Input device 6 can be displaced in housing 2 within slit 4. The input device can be fixed in a desired position by means of, e.g., screws, in the bottom of the housing (not shown).

Figure 3:
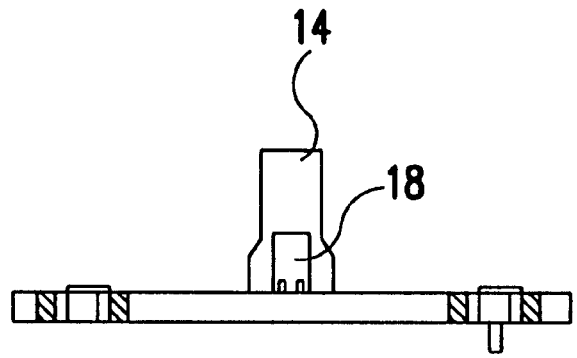
FIG. 3 is a sectional view of an input device according to a further embodiment of the invention to use in three dimensional control of an object on a computer monitor.

When using the input device to control an object on a computer, monitor stick 14 is moved in the direction of the desired object movement in the X Y plane. Thereby, strain gauges 18 (FIG. 3) adhered to stick 14 are activated and cause a signal to the computer as described above.

Figure 4:
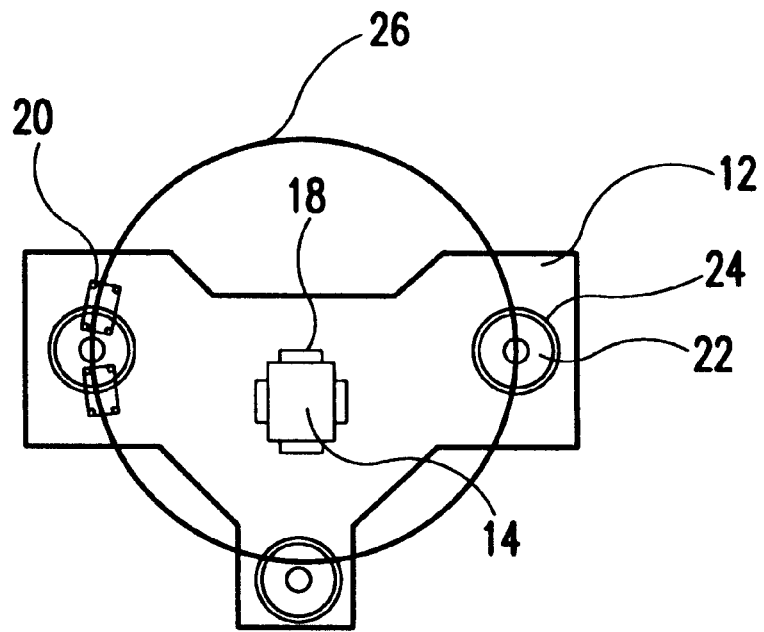
FIG. 4 is a top plane view of the device shown in FIG. 3.

FIG. 4 shows, in greater detail, the arrangement of strain gauges 18 and additional strain gauges 20 to be used in controlling object in an extra dimension, such as the perspective plane in the Z direction or the rotation of the object.

Control of the object in the extra dimension is obtained by twisting stick 14 in the direction around its axis. By movement of the stick around its axis, base plate 12 is slightly deflected with respect to its fixing area 22 via a flexible connection 24, which movement is detected by strain gauges 20.

In the preferred embodiment shown, flexible connection 24 is provided in the form of an annulus between the base plate and the fixing area. The annulus may be made of any flexible material, such as rubber, silicon gum or soft polymers. Strain gauges 20 are adhered at one end on the base plate and at the other end on the fixing area, preferably along a circular line 26 encircling corresponding fixing areas. Thereby, maximum sensitivity of the strain gauges 20 is obtained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wrist support for computer keyboard, comprising:
   a housing having an upper face, the upper face of the housing including a slit;
   an input device comprising a control stick uprightly arranged on a base plate, a number of strain gauge transducers being adhered to the control stick, wherein the base plate is displaceably arranged within the housing and the control stick is positioned in the slit in the upper face of the housing; and
   at least one function key displaceably arranged in the slit of the housing.

2. The wrist support of claim 1, wherein the base plate of the input device is lockable in position by locking means in the housing.

3. The wrist support of claim 1, wherein the base plate of the input device is lockable in position by locking means in the base plate.

4. The wrist support of claim 1, wherein the function key is a lockable blocking means.

* * * * *